United States Patent
Frolund et al.

(10) Patent No.: US 7,325,237 B2
(45) Date of Patent: Jan. 29, 2008

(54) SYSTEM HAVING CUSTOMIZATION MODULES TO PROVIDE CUSTOMIZATIONS

(75) Inventors: Svend Frolund, Mountain View, CA (US); James Christopher Pruyne, Naperville, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 884 days.

(21) Appl. No.: 10/037,107

(22) Filed: Dec. 29, 2001

(65) Prior Publication Data

US 2003/0126312 A1   Jul. 3, 2003

(51) Int. Cl.
*G06F 9/44* (2006.01)

(52) U.S. Cl. .......................... 719/328; 709/246

(58) Field of Classification Search ........ 709/201–203, 709/223, 226, 246; 705/35; 717/100; 719/328, 719/310, 331–332
See application file for complete search history.

(56) References Cited

U.S. PATENT DOCUMENTS

| | | | |
|---|---|---|---|
| 5,710,884 A * | 1/1998 | Dedrick | 709/217 |
| 6,115,755 A * | 9/2000 | Krishan | 709/250 |
| 6,175,869 B1 * | 1/2001 | Ahuja et al. | 709/226 |
| 6,345,382 B1 * | 2/2002 | Hughes | 717/100 |
| 6,349,290 B1 * | 2/2002 | Horowitz et al. | 705/35 |
| 6,594,682 B2 * | 7/2003 | Peterson et al. | 718/102 |
| 6,606,708 B1 * | 8/2003 | Devine et al. | 713/201 |
| 6,615,258 B1 * | 9/2003 | Barry et al. | 709/223 |
| 6,654,814 B1 * | 11/2003 | Britton et al. | 709/246 |
| 6,769,009 B1 * | 7/2004 | Reisman | 709/201 |
| 6,848,079 B2 * | 1/2005 | Ito | 715/523 |
| 6,934,532 B2 * | 8/2005 | Coppinger et al. | 455/412.1 |

* cited by examiner

*Primary Examiner*—Van H. Nguyen

(57) ABSTRACT

A computer system and software are provided for customizing on-line computer services. An application is able to interact with a sub-system between which an interceptor system can be interposed. The interceptor system includes a proxy interacting with the application, a customization module interacting with the proxy and a dispatcher interacting with the customization module and interacting with the sub-system. A customization repository contains the customization module and interacts with a service and a client sharing the application and the sub-system. A control interacts with the customization repository and the service for causing customization of the service and the client by disposing the proxy to interact with the application and the dispatcher to interact with the sub-system.

24 Claims, 2 Drawing Sheets

SYSTEM HAVING CUSTOMIZATION MODULES TO PROVIDE CUSTOMIZATIONS

TECHNICAL FIELD

The present invention relates generally to computer systems and more particularly to non-functional properties of computer systems.

BACKGROUND ART

The operation of a computer system can be described in many ways. The most obvious ways to describe a system is to describe its applications or the functions it performs. That is, what the computer system actually does, such as manage bank accounts, airline reservations, and so on. The Quality of Service (QOS) or so-called "non-functional" aspects of a computer system can also be described. The term non-functional refers to all aspects of the system other than the basic function for which the system was built. Examples of non-functional properties include performance (i.e. how quickly the system performs its function), reliability (i.e. how often the system successfully performs its function), security, and so forth. Because the non-functional aspects of a system are somewhat less obvious, they also often receive less attention by designers of computer systems.

One approach to improving the non-functional characteristics of a computer system is to mingle the implementation of the desired non-functional properties with the functional properties. Commonly, programmers hardwire a single set of non-functional properties into a computer system. Moreover, the logic that implements the non-functional properties is rarely specified in one place, but is instead scattered as point solutions across the algorithms, which implement the purely functional aspects of the system. Frequently, when systems are built this way, the designers are not even aware of the distinction between functional and non-functional properties.

There are several disadvantages to the above approach. First, it is hard to change the non-functional properties of a system to adapt to varied requirements that arise in the same environment if they are implemented as a point-solution. Second, because programs typically contain point-solutions to non-functional issues, and because these point solutions are hard to identify in their own right, it is hard to alter the non-functional behavior of a system as it is deployed in varied environments. Third, it is hard to reuse the logic, which implements non-functional properties, because a design that is well provisioned for a particular non-functional property as it relates to one application may not be at all suitable to another application. Therefore, the work on this particular non-functional property cannot benefit future applications. Likewise, later developments to improve non-functional properties cannot be easily applied to pre-existing applications.

Another approach has been to improve the characteristics of specific components of a system that applications depend upon. For example, the performance of an application that uses a database can be improved by improving the performance of the database system that the application uses. The typical difficulty with this approach is that by changing the underlying sub-system, the behavior for all applications that use that sub-system are changed. It is not possible to selectively choose which applications or under what circumstances these applications should use the modifications. In many cases, augmentations involve trade-offs so not having the flexibility to determine when to use them is a serious problem.

A further approach, often referred to as aspect-oriented programming, has been to provide an application developer with a way to specify the desired or required non-functional properties of their application. A development system is then used to merge the function of the application with these desired properties to generate the final application. However, as with the previous approach, it does not allow for new decisions to be made after the application is completed. Those non-functional properties specified by the developer are now part of the application, and cannot be modified later.

Also in the past, object-oriented middleware systems have been developed so that developers are able to build distributed applications almost as easily as non-distributed applications. This simplification has been the primary goal of middleware, and in particular, it has concentrated on the functional aspects of a distributed application and little effort has been made to support developers of non-functional aspects.

Middleware is, however, a good fit for supporting non-functional requirements because it has very nearly an end-to-end view of the system. Additionally, a great deal of semantic information such as application interface definitions and pairing of request and response messages is available. Because of this, many research efforts have focused on supporting non-functional requirements in middleware. These generally fall into two categories. The first category is to embed enhancements for specific properties into the middleware. The second category is to make non-functional concerns explicit in the development of an application. Both categories have similarities with aspect-oriented programming. A specification is written in parallel to the application specification, and the middleware merges these to create an augmented application. Unfortunately, these still suffer from some of the disadvantages described above.

There seemed to be insurmountable problems with developing a middleware system with adequate support for non-functional properties because no assumptions about application specific information, such as interface definitions, are available to developers of non-functional components. Further, it is not possible to know a priori what non-functional properties will be required for particular deployments or instances of services, clients, or client-service pairs. The solution must be general enough to enable a variety of customizations without becoming so complex or specific that it is difficult to use and it must take into account possibly conflicting goals, such as high speed versus security. Further, there must be client/server neutrality for use on either the client or the server side of a distributed interaction and the solution must be independent of any particular middleware.

Those skilled in the art have long sought a solution, but the solution has long eluded them.

DISCLOSURE OF THE INVENTION

The present invention provides a computer system and software for customizing on-line computer services. An application is able to interact with a sub-system between which an interceptor system can be interposed. The interceptor system includes a proxy having an interaction with the application, a customization module providing a customization and having an interaction with the proxy and a dispatcher having an interaction with the customization module and having an interaction with the sub-system. A customization repository contains the customization modules and has interaction with a service and a client sharing the application and the sub-system. A control console has an interaction with the customization repository and the service for causing customization of the service and the client by disposing the proxy to interact with the application and the dispatcher interact with the sub-system. It is easy to change the non-functional properties of the system to adapt to varied requirements that arise in the same environment, to alter the non-functional behavior of the system as it is deployed in varied environments, and to reuse the logic, which implements non-functional properties. The invention is general enough to enable a variety of customizations without becoming so complex or specific that it is difficult to use and it takes into account possibly conflicting goals, such as high speed versus security. Further, there is client/server neutrality for use on either the client or the server side of a distributed interaction and the software is independent of any particular middleware.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
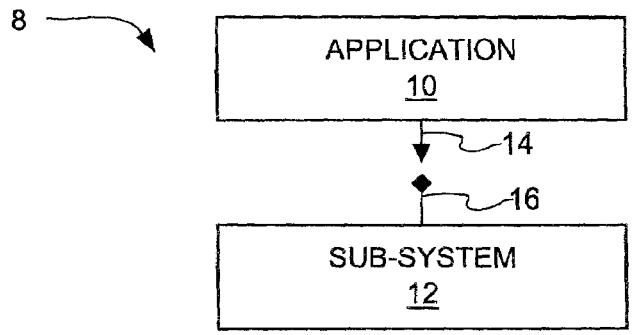
FIG. 1 (PRIOR ART) shows a block diagram of a prior art software system.

Referring now to FIG. 1 (PRIOR ART), therein is shown a block diagram of a software system 8 having an interaction between an application 10 and a sub-system 12. The application 10 is a logical entity, which a human interacts with and which can be thought of as a computer application program. The sub-system 12 can be one of a number of sub-systems of different types, such as a database, a computer operating system, or a computer network.

The application 10 is able to "invoke" 14, as represented by a down-pointing arrow, the sub-system 12. The invoke 14 indicates that the application 10 will use the sub-system 12 to perform some function for which the sub-system 12 has been specifically designed. For example, a database that manages data for system storage such as a disc drive. By invoking the sub-system, the application is making a request to the sub-system to perform a specific function.

The functions that the sub-system 12 can perform are referred to as its "interface" 16, as represented by a diamond-headed arrow. The interface 16 specifies the method by which the sub-systems may communicate and is essentially the list of the operations that the sub-system 12 can perform for the application 10.

This layered structure in FIG. 1 along with the well-defined interfaces provides an opportunity to transparently customize or alter the interactions between the application and the sub-systems it utilizes.

Figure 2:
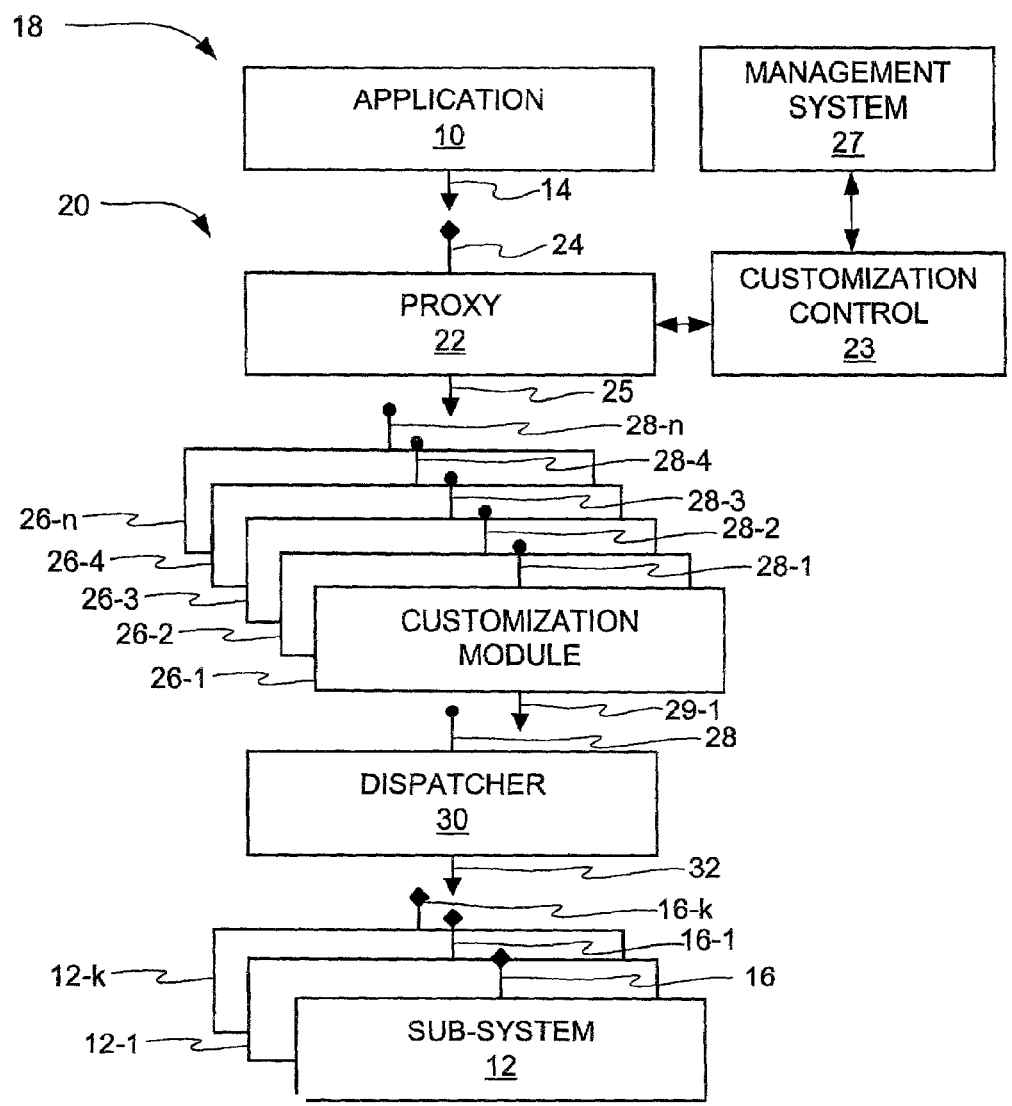
FIG. 2 shows a block diagram of a software system in accordance with the present invention.

Referring now to FIG. 2, therein is shown a block diagram of a software system 18 having an interceptor system 20 according to the present invention. The interceptor system 20 includes a proxy 22 having a first proxy interface 24, which substitutes the interactions of the proxy 22 for the interactions of the sub-system 12 with application 10. The computer language description of the interface 16 is used to generate the first proxy interface 24 to be the same as the interface 16. Also shown is a plurality of sub-systems 12-1 through 12-$k$ with respective interfaces 16-1 through 16-$k$, which are possible with the present invention and which will be described later.

The proxy 22, under the control of a customization control 23, facilitates dynamic customization of the behavior of the application 10 for a plurality of customization modules 26-1 through 26-$n$. To do this, the proxy 22 performs two specific functions.

First, the proxy 22 prepares interactions between the application 10 and the sub-system 12 to be customized. This is done by collecting all of the data related to the interaction into a standard representation that can be understood by the plurality of customization modules 26-1 through 26-$n$, as will later be explained. This process is important because the standard representation allows customization logic to be developed independently of the application 10 or the sub-system 12. The customization will always work on the same representation of the interaction regardless of the application or sub-system in use.

Second, the proxy 22 provides for the management and control of the plurality of customization modules 26-1 through 26-$n$ through the customization control 23. The proxy 22 provides a means of adding or removing the plurality of customization modules 26-1 through 26-$n$ while the application 10 is running.

A management system 27 can install the plurality of customization modules 26-1 through 26-$n$ for the application 10 at any time, even during run-time, by means of the customization control 23. This provides an immense degree of flexibility to the software system 18.

The plurality of customization modules 26-1 through 26-$n$ have a plurality of first customization interfaces 28-1 through 28-$n$, which is common for interfacing with a second proxy interface 25 to allow for applications to be managed. For example, a customization module 26-2 that measures the current performance level as seen by the application 10 can be installed, and based on those performance measurements, performance customization modules 26-3 and 26-4 that are most suitable can be installed. To implement the control interface, the proxy 22 maintains a set of active customization modules in a chain in which one customization module passes control on to the next.

Since the plurality of first customization interfaces 28-1 through 28-$n$ are all the same, a single customization can to be used in any situation, regardless of the application or sub-system being used. Each of the plurality of customization modules 26-1 through 26-$n$ is programmed to have some or all of the following capabilities as they inspect or alter the flow of invocations from the application 10 to the sub-system 12:

1. Error Handling—Each can intercept errors generated by the sub-system 12, and handle them before the errors are returned to the application 10.
2. Error Creation—Each may indicate a failure to the application 10, even if the underlying sub-system 12 has not generated or detected a failure.
3. Invocation inspection—Each may inspect the invocation to determine what data is being used during the invocation. This is possible because of the standardized representation of the invocation created by the proxy 22.

4. Inserting and extracting extra data or parameters—Each may insert or remove data into or out of the standard representation. It may do this to provide additional data to the plurality of customization modules 26-1 through 26-n or to the sub-system 12 being invoked.
5. Short-circuiting/local handling—Each can prevent the invocation from reaching the sub-system 12 entirely if it should choose to do so and can send it to a different sub-system.

The customization modules 26-1 through 26-n have second customization interfaces (only second customization interface 29-1 shown) to interface with a first dispatcher interface 28 of a dispatcher 30. The first dispatcher interface 28 is the same as the first customization interfaces 28-1 to 28-n. The dispatcher 30 performs the inverse operation as the proxy 22. It receives an invocation from the plurality of customization modules 26-1 through 26-n, and transforms it into an invocation at a second dispatcher interface 32 for the interface 16 of the sub-system 12. This invocation may have been altered or customized by the customization modules 26-1 through 26-n preceding it in the interceptor system 20. In some cases, the dispatcher 30 may be used to further customize the invocation by directing it to a sub-system other than the one originally used by the application 10. An example of this might be forcing the invocation to cross a network rather than being performed on the local computer. One use of this approach would be to access files stored on a remote computer instead of the files stored on a local computer and provided by the local file management sub-system.

In alternate embodiments, each of the plurality of first customization modules 26-1 through 26-n are developed to perform different non-functional operations and the customization control 23 provides different ways of managing the plurality of customization modules 26-1 through 26-n that are being used. For example, the customization control 23 can provide very specific control over matters such as the order in which the plurality of customization modules 26-1 through 26-n are invoked, their performance, failure modes, frequency of usage, system optimization, etc.

Figure 3:
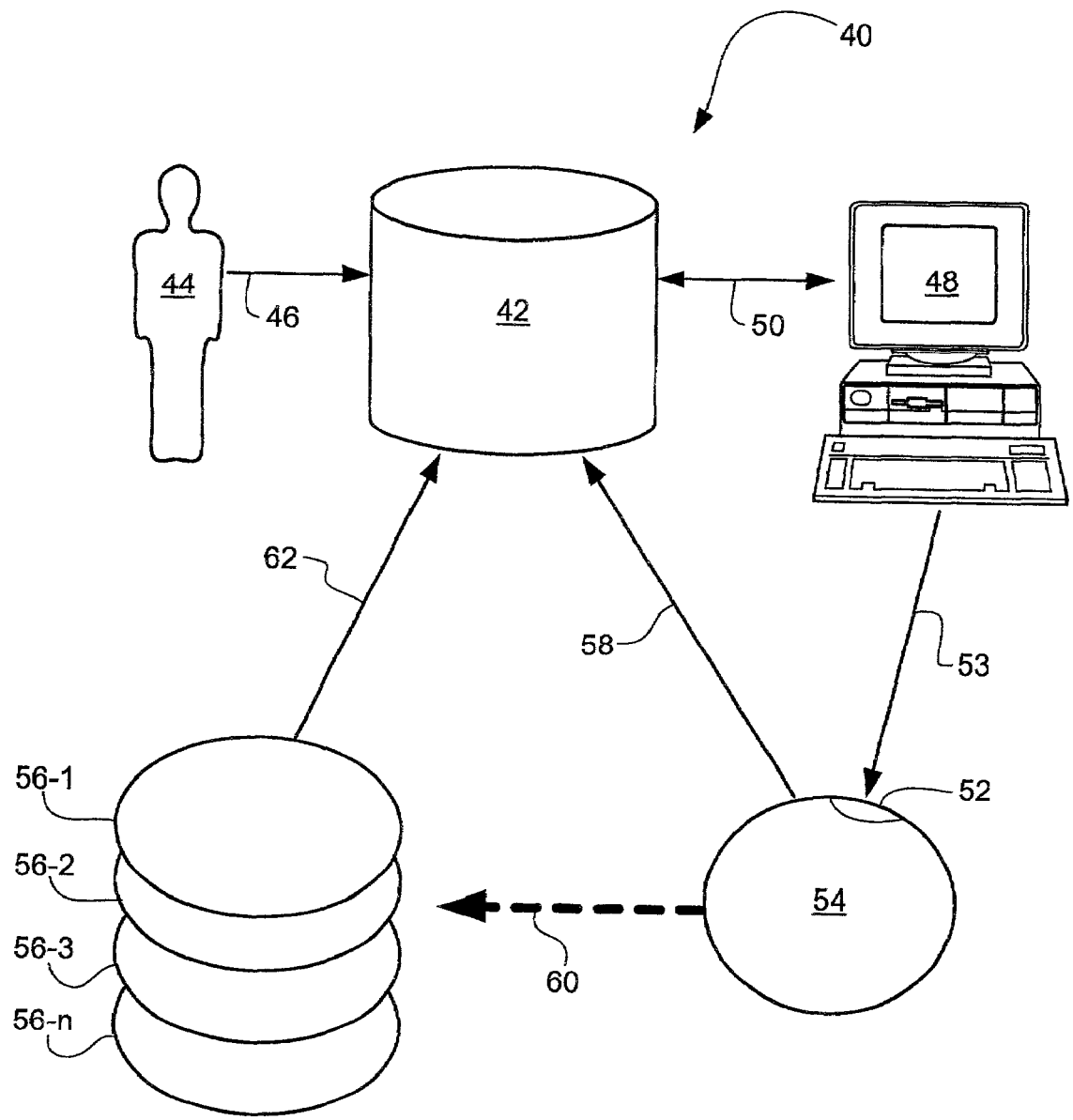
FIG. 3 shows a computer system in accordance with the present invention.

Referring now to FIG. 3, therein is shown a computer system 40 for adding customizations to services while the services are running in accordance with the present invention. The hub of the computer system 40 is a customization repository 42 where customizations are stored as executable (as opposed to source code only) software modules.

When a customization developer using a customization developer system 44 develops a new customization, it is uploaded along the link 46 to the customization repository 42, along with its description and additional meta-data such as whether it can be applied to clients, servers, or both. Administrators use a computer console 48 to deploy customizations to individual or groups of services. The computer console 48 presents the administrator with all available customizations by querying the customization repository 42 along a link 50. Using the customization repository 42 in this way decouples development and deployment of customizations. When a new customization is created, the developer simply places it in the customization repository 42, which in turn updates the computer console 48 with its availability across link 50. A customization deployment interface 52 has been added to every service. In one embodiment, the customization deployment interface 52 is implemented within the middleware libraries so that no changes to the application 10 are required. The customization deployment interface is essentially equivalent to the customization control 23 of FIG. 2. The computer console 48 invokes the customization deployment interface 52 through a link 53 to load a customization into the service 54 or into a service's clients 56-1 through 56-n. If the customization is to be loaded into the service 54, the service 54 contacts the customization repository 42 by a link 58 to retrieve the named customization and installs it using the customization control 23 described above for FIG. 2. If the customization is for the service's clients 56-1 through 56-n, the service 54 propagates this request to its clients 56-1 through 56-n via a link 60 to each client. When each client receives the request, it behaves like the service 54 by retrieving the customization from the customization repository 42 through a link 62 and installing it via the customization control 23.

Downloading executable code into the service 54 or the client 56 requires the service 54 to be able to trust that code not to be malicious. It is assumed that the customization repository 42 is a trusted entity, so code retrieved from it is safe. An alternative, and more scalable, architecture includes the executable code with the customization command to the service 54. Maintaining the trust relationship, when arbitrary entities can request customization operations, will be more difficult than with the well-known repository so additional security could be established by digitally signing the customization modules.

A first example of how customization is used would be what is referred to as "caching", which would be for performance purposes. When a request comes in, the customization module 26-n can look at the set of input data to the request and can determine if there has been the exact same request that has the exact same input data, in the past. The customization module 26-n can return the same result that it saw last time if it can make assumptions about the result not changing because the inputs do not change. If it has not seen this set of input data in the past, it goes ahead and pushes the request into the sub-system 12. Then when the customization module 26-n receives the result, it remembers the result that it received so that on a future invocation when it sees the same inputs it can simply return the value that it saw in this invocation.

A second example of how customization is used is for availability purposes or high availability purposes. An individual customization module 26-4 can be written that will mask or make failures of an underlying sub-system not visible to higher layers of the system such as the application or indeed the actual user of the application.

The customization module 26-4 will receive the call from the application 10 before it goes to the sub-system 12. In a normal case it will simply forward that invocation on to the sub-system 12. But in the case of a failure where the sub-system 12 does not correctly handle the invocation, its status returned from the operation as a failure or a failure to return within a specified time. The customization module 26-4 can detect that situation, detect and find a new sub-system 12-1 through 12-k, whether dynamically at run-time by going out and asking another service (not shown) where a replacement is, or statically from a static list of different sub-systems that are all equally able to handle a request. In any case, it will have the knowledge of an alternative sub-system and undetected it will take the original invocation request and make that request to a second sub-system and with the expectation that one will perform correctly and then the result can be returned back up to the application 10. So by intercepting or seeing these failures in the customization module, a new sub-system can be found to actually run the operation, and return the result without the application 10 actually knowing that a failure ever occurred.

Failures of hardware and software components are inevitable, so the goal of high availability systems is to mask or hide failures as often as possible so that they do not interfere with the tasks users wish to perform. In a distributed system the goal is for remote services to appear to be operating continually even when the reality is that components that make up the service are not functioning. A crucial part of achieving this is detecting when a failure occurs, discovering an alternate server, and continuing operations with this new server. This process is referred to as "failover". Assuming that the servers are stateless between client invocations, and that they have no side-effects such as updates to a database or file system, a collection of servers and a basic failover may be all that is needed for a service to be continuously available.

As a concrete example of the invention in practice, consider an automated teller machine. It must communicate with computer systems at a bank to complete an individual's transaction. So, in the context of the invention, the teller machine is the application 10 with the bank's computers acting as the sub-system 12 that executes a transaction. By use of the invention, the teller machines can be made more reliable by use of a fail-over mechanism as described above. This fail-over mechanism must be somewhat more sophisticated than described previously to guarantee that no transactions are lost or duplicated, but would be obvious to one having ordinary skill in the art based on the description herein. Teller machines can be instructed via a customization console 48 to install a fail-over module as described. This module can be written to use alternate bank computers (for example, at different geographic locations) to process a transaction if the first attempt fails. By using the invention, these customization modules can be changed after the teller machine is in place to change the fail-over policy such as using entirely new set of back-up locations in case of failures. Because this is permitted to be done on-line, and remotely, these changes can be made without taking the teller machines out of service and without forcing people to physically visit and change the machines providing tremendous time and cost savings, and leading to teller machines that are functioning more often.

The computer system 40 is described as a system for customizing on-line computer services because the disclosed invention permits computer systems to be customized during operation without interrupting the service that they are providing. Further, those who create customizations, the customization developers, and who populate the customization repository 42 with customizations can work on the computer system 40 at the same time that customizations are being produced and tested.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A computer system comprising:
an application;
a sub-system for having an interaction with the application;
an interceptor system including:
a proxy having an interaction with the application and including a customization control,
a customization module providing a customization and having an interaction with the proxy, and
a dispatcher having an interaction with the customization module and having an interaction with the sub-system;
a customization repository for containing the customization module;
a service having an interaction with the customization repository;
a client having an interaction with the service; and
the customization control having an interaction with the customization repository and the service for causing customization of the service and the client by disposing the proxy of the interceptor system to interact with the application and the dispatcher of the interceptor system to interact with the sub-system,
the customization repository to store an additional customization module providing another customization, the customization control to add the additional customization module to the interceptor system while the application is running.

2. The computer system as claimed in claim 1 wherein:
the client has an interaction with the customization repository, the client responsive to the customization control through the service for causing customization of the service and the client by disposing the proxy of the interceptor system to interact with the application and the dispatcher of the interceptor system to interact with the sub-system.

3. The computer system as claimed in claim 1 including:
a customization developer system having an interaction with the customization repository for providing customizations thereto while the service is interacting with the client.

4. The computer system as claimed in claim 1, wherein each of the customization modules has a different customization; and wherein: the customization control is for controlling the interaction of the customization modules with the proxy.

5. The computer system as claimed in claim 1 including:
a plurality of sub-systems;
wherein each of the plurality of sub-systems has a different function; and
the customization control is for controlling the interaction of the plurality of sub-systems with the dispatcher.

6. The computer system as claimed in claim 1 wherein:
the service includes a customization deployment interface for interacting with the customization control to cause a group including the service and the client to obtain a customization.

7. The computer system as claimed in claim 1 wherein:
each customization module is for customization of a non-functional property of the computer system.

8. The computer system as claimed in claim 1 wherein:
each customization module is selected from a group consisting of performance related, security related, and failure related modules.

9. A computer system comprising:
an application;
a sub-system for having an interaction with the application;
an interceptor system between the application and the sub-system including:
a proxy having an interaction with the application, and including a a customization control;

a first customization module providing a first customization for a first non-functional property of the computer system and having an interaction with the proxy, and a dispatcher having an interaction with the first customization module and having an interaction with the sub-system;

a customization repository for containing a second customization module providing a second customization for a second non-functional property, the customization control to add the second customization module to the interceptor system while the application is running.

10. The computer system of claim 9, wherein the first non-functional property comprises failover control.

11. The computer system of claim 9, wherein the first non-functional property comprises error handling and the second non-functional property comprises performance measurement.

12. The computer system of claim 9, wherein the first non-functional property comprises failure masking.

13. A computer system comprising:
an application;
a plurality of sub-systems for having an interaction with the application;
an interceptor system including:
a proxy having an interaction with the application and including a customization control,
a plurality of customization modules providing customizations for a plurality of non-functional properties of the computer system and having an interaction with the proxy as controlled by the customization control, and
a dispatcher having a selectable interaction with the plurality of customization modules and having an interaction with the plurality of sub-systems;
a customization repository for containing the customization modules,
the customization control to install at least one of the customization modules to the interceptor system while the application is running.

14. A software system stored on at least a computer-usable storage medium for execution in a computer system, the software system comprising:
an application;
a sub-system to interact with the application; and
an interceptor system between the application and sub-system, including:
a proxy to interact with the application and including a customization control;
a first customization module providing a first customization, the first customization module to interact with the proxy;
a dispatcher to interact with the customization module and with the sub-system; and
a second customization module providing a second customization,
the second customization module to interact with the proxy and the dispatcher,
the customization control to enable addition of the second customization module to the interceptor system while the application is running.

15. The software system as claimed in claim 14 including:
a control for causing the proxy of the interceptor system to interact with the application and the dispatcher of the interceptor system to interact with the sub-system.

16. The software system as claimed in claim 14 including:
a customization developer system for developing additional customization modules; and
a customization repository to store the additional customization modules,
the additional customization modules in the customization repository to be communicated
to the interceptor system over a link.

17. The software system as claimed in claim 14 wherein:
the customization control is for controlling the interaction of the first and second customization modules with the proxy.

18. The software system as claimed in claim 14 including:
a plurality of sub-systems; and
the customization control is for controlling the interaction of the plurality of sub-systems with the dispatcher connected to a group including the application, the proxy, and the dispatcher.

19. The software system as claimed in claim 14 wherein:
the customization modules are selected from a group consisting of performance related, security related, and failure related modules.

20. The software system of claim 14, the interceptor system to enable removal of the first customization module while the application is running.

21. The software system of claim 14, wherein the customization provided by the first customization module comprises at least one of performance measurement and failure masking.

22. The software system of claim 14, wherein the proxy has an interface to the application; and the first customization module has a first interface to the proxy, and a second interface to the dispatcher.

23. A software system stored on at least a computer-usable storage medium for execution in a computer system, the software system comprising:
an application;
a sub-system for having an interaction with the application; and
an interceptor system including:
a proxy having an interaction with the application and including a customization control;
a customization module to perform a non-functional operation of the software system and having an interaction with the proxy, the non-functional operation comprising a failover operation,
the customization control to control interaction of the customization module with the proxy; and
a dispatcher having an interaction with the customization module and having an interaction with the sub-system,
wherein the customization control adds another customization module to the interceptor system while the application is running, the another customization module to perform an additional non-functional operation.

24. A software system stored on at least a computer-usable storage for execution in a computer system, the software system comprising:
an application;
a plurality of sub-systems for having an interaction with the application; and an interceptor system including:
   a proxy having an interaction with the application and including a customization control;
   a plurality of customization modules providing customizations for a plurality of non-functional properties of the software system and having an interaction with the proxy, the non-functional properties comprising at least failure masking and performance measurement;
   a dispatcher having a selectable interaction with the plurality of customization modules and having an interaction with the plurality of sub-systems; and
the customization control to add at least one of the customization modules to the interceptor system while the application is running.

* * * * *

UNITED STATES PATENT AND TRADEMARK OFFICE
CERTIFICATE OF CORRECTION

PATENT NO. : 7,325,237 B2  
APPLICATION NO. : 10/037107  
DATED : January 29, 2008  
INVENTOR(S) : Svend Frolund et al.

It is certified that error appears in the above-identified patent and that said Letters Patent is hereby corrected as shown below:

In column 8, line 66, in Claim 9, after "application" delete ",".

In column 8, line 67, in Claim 9, after "including" delete "a".

In column 8, line 67, in Claim 9, after "control" delete ";" and insert -- , --, therefor.

In column 10, line 63, in Claim 24, after "storage" insert -- medium --.

Signed and Sealed this

Tenth Day of June, 2008

JON W. DUDAS  
*Director of the United States Patent and Trademark Office*